Jan. 8, 1924.

R. JACOBI 1,480,075

ANIMAL TRAP

Filed Oct. 16, 1922

INVENTOR.
RUDOLF JACOBI.
BY A.B.Bowman
ATTORNEY

Patented Jan. 8, 1924.

1,480,075

UNITED STATES PATENT OFFICE.

RUDOLF JACOBI, OF SAN DIEGO, CALIFORNIA.

ANIMAL TRAP.

Application filed October 16, 1922. Serial No. 594,800.

*To all whom it may concern:*

Be it known that I, RUDOLF JACOBI, a citizen of the United States, residing at San Diego, in the county of San Diego and State of California, have invented certain new and useful Improvements in Animal Traps, of which the following is a specification.

My invention relates to an animal trap, more particularly for rats and the objects of my invention are; first, to provide a trap of this class in which animals are lured into a cage and trapped therein by the closing of the entrance to the cage; second, to provide a trap of this class in which the entrance is closed by the animals themselves by going after the bait positioned on a shiftable platform; third, to provide a trap of this class in which the cage, in which the animals are trapped may be easily removed from the supporting frame for transferring the same, for killing the animals by drowning or otherwise disposing of the same; fourth, to provide a trap of this class in which the mechanism, provided for closing the compartment is electrically operated; fifth, to provide a novelly constructed trap, and sixth, to provide a trap of this class which is very simple and economical of construction, durable, efficient in its action, which is silently operated and which will not readily deteriorate or get out of order.

Figure 1:
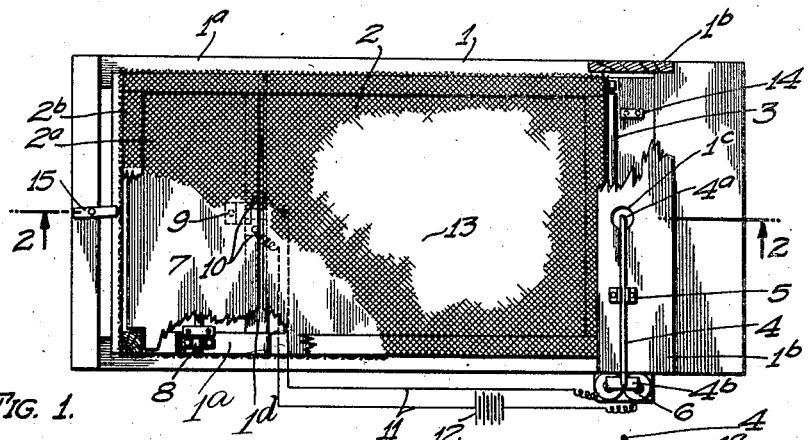
Figure 2:
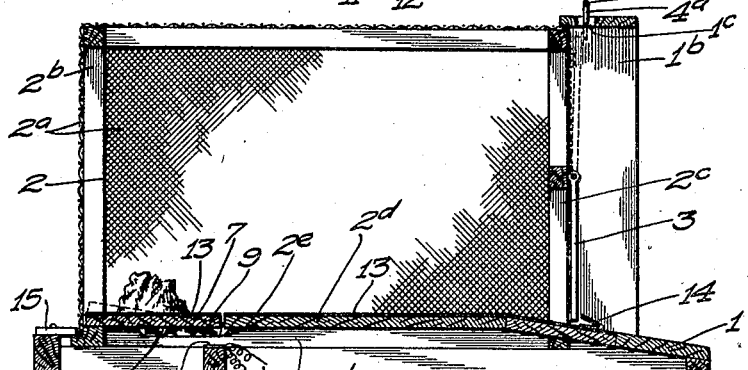
Figure 3:
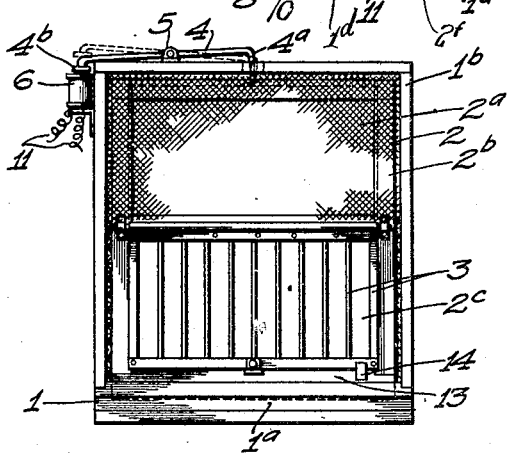
Figure 4:
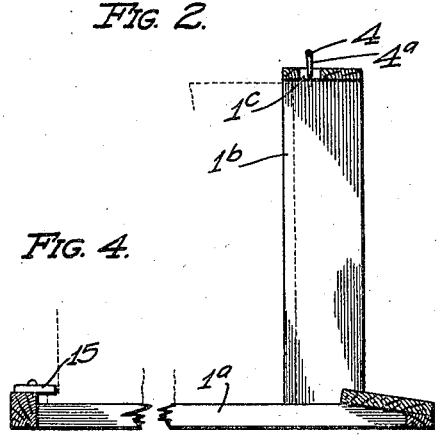

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a plan view of my animal trap with certain portions broken away and in section to facilitate the illustration; Fig. 2 is a sectional elevational view taken through 2—2 of Fig. 1; Fig. 3 is a front elevational view thereof, and Fig. 4 is a fragmentary sectional elevational view of the supporting frame for the removable cage.

Like characters of reference refer to similar parts and portions throughout the several views of the drawings.

The supporting frame 1, cage 2, door 3, trip member 4, journal member 5, electromagnets 6, platform 7, journal members 8, switch members 9 and 10, conductors 11, battery 12, floor covering 13, and the latch members 14 and 15 constitute the principal parts and portions of my trap.

The supporting frame 1 consists of a base portion $1^a$ and an upwardly extending frame portion $1^b$. The cage 2 consists of a wire mesh screen $2^a$, supported on a frame $2^b$, preferably wood. Said cage is provided with an opening $2^c$ at one end, over which is hinged the door 3, as shown best in Figs. 2 and 3 of the drawings. Said cage is adapted to be positioned on the supporting frame 1 and is prevented from being shifted relatively thereto by the upwardly extending frame portion $1^b$ which forms three sides of the cage 2 and is locked in such position by the latch member 15 provided at the base portion of the supporting frame 1 as shown best in Figs. 1 and 2 of the drawings. The door 3 is pivotally mounted on a horizontal axis and when opened and positioned in a substantially vertical position as shown by dotted lines in Figure 2 of the drawings, is adapted to be engaged by the downwardly extending portion $4^a$ of the trip member 4, which is pivotally mounted in the journal member 5 positioned at the upper end of the frame portion $1^b$ of the supporting frame 1. Said downwardly extending portion $4^a$ of the trip member 4 extends through an opening $1^c$ of the frame portion $1^b$. The other end of said trip member 4 is provided with a metal plate $4^b$, below which are positioned the electro-magnets 6 secured to the frame portion $1^b$. The floor $2^d$ of the cage 2 is cut away at the rear portion of the cage and a platform 7 is substituted which platform is pivotally mounted in the journal members 8 provided in recess portions $2^e$ in the lower side rails $2^f$ of the cage 2. Said recess portions $2^e$ permit the tilting of the platform 7 forwardly as shown by dotted lines in Fig. 2 of the drawing. Said platform is provided on its under side with a resilient switch member 9 which is adapted to engage stationary switch members 10, supported below said platform on a cross member $1^d$ of the base portion of the supporting frame when the platform is tilted forwardly, caused by the animal stepping on the same. The switch members 10 are electrically connected to the electromagnet 6 and to a battery 12 by the conductors 11 as shown diagrammatically in Fig. 1 of the drawings. Both the permanent floor 2ᵈ and the platform 7 are covered with a smooth covering, preferably a metallic plate 13, so that the animals in the compartments will not be able to get a footing when they see the door closing over the opening. A latch 14 is provided in front of the opening of the cage and preferably secured to the floor portion thereof, which is adapted to keep the door closed over the opening after it is released by the trip member 4 and swings downwardly about its pivots.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

It is obvious that an animal entering the cage 2, attracted by the lure of bait on the platform at the rear portion thereof, will step on the front portion of the platform 7 when attempting to get the bait or food, forcing the switch member 9 to engage the switch members 10, making an electrical contact and an electrical current will pass through the circuit causing the electromagnet to attract the metal plate at one end of the trip member 4, disengaging the downwardly extending portion of the same from the free end of the door, permitting said door to fall downwardly about its pivots with a force sufficient to depress the resilient latch member 14 and lock the door behind the same, thus trapping the animal within the cage.

It is further obvious that after the animal is within the cage as described above, the cage 2 may be removed from the supporting frame 1 by turning the latch member 15 at an approximate right angle to the position shown in the drawing, shifting the cage backwardly on said support and removing the same therefrom, thus providing a convenient means for transporting the animals trapped in the cage or disposing of the same in a convenient manner.

Having thus described by invention what I claim as new and desire to secure by Letters Patent, is:

1. An apparatus of the class described, including a supporting frame consisting of a base and an upwardly extending frame portion, a removable cage provided with an opening at one end, positioned in said supporting frame, a door positioned contiguous to the opening of said cage, a trip means supported by the frame portion of said supporting frame and so positioned as to engage the door when the latter is open, a movable platform positioned within and near one end of said cage and adapted to be connected to said trip means by the movement of the former.

2. An apparatus of the class described, including a supporting frame consisting of a base and an upwardly extending frame portion, a removable cage provided with an opening at one end, positioned in said supporting frame, a door positioned contiguous to the opening of said cage, an electromagnet supported on the frame portion of said supporting frame, a tripping member mounted on said frame portion and so positioned as to engage the door when the latter is in an open position and also so positioned as to be shifted by said electromagnet.

3. An apparatus of the class described, including a supporting frame consisting of a base and an upwardly extending frame portion, a removable cage provided with an opening at one end, positioned in said supporting frame, a door positioned contiguous to the opening of said cage, an electromagnet supported on the frame portion of said supporting frame, a tripping member mounted on said frame portion and so positioned as to engage the door when the latter is in an open position and also so positioned as to be shifted by said electromagnet, a platform positioned within and at the rear portion of said cage and a switch in connection with said platform connected with said electromagnet and a source of electrical energy.

4. An apparatus of the class described, including a supporting frame provided with a base and a frame portion, a cage provided with an opening in one end supported by said supporting frame, retaining means positioning said cage and said supporting frame relatively to each other, a door pivotally mounted on said cage over the opening therein, an electromagnet mounted on the frame portion of said supporting frame, a tripping member pivotally mounted on the upper portion of said frame portion, so positioned and constructed as to engage said door when the latter is in open position, and also adapted to be attracted by said electromagnet and switch means connected to said electromagnet and a source of electrical energy.

5. An apparatus of the class described, including a supporting frame provided with a base and a frame portion, a cage provided with an opening in one end supported by said supporting frame, retaining means positioning said cage and said supporting frame relatively to each other, a door pivotally mounted on said cage over the opening therein, an electromagnet mounted on the frame portion of said supporting frame, a tripping member pivotally mounted on the upper portion of said frame portion, so positioned and constructed as to engage said door when the latter is in open position and also adapted to be attracted by said electromagnet, a platform positioned within and at the rear portion of said cage, a resilient switch member mounted at the lower portion of said platform, a stationary switch member positioned contiguous to said resilient switch member and electrical conductors connecting said switch members to said electromagnet and a source of electrical energy.

In testimony whereof, I have hereunto set my hand at San Diego, California, this 7th day of October, 1922.

RUDOLF JACOBI.